US011010100B1

(12) United States Patent
Gray et al.

(10) Patent No.: US 11,010,100 B1
(45) Date of Patent: May 18, 2021

(54) SYSTEMS AND METHODS FOR ASYNCHRONOUS WRITING OF SYNCHRONOUS WRITE REQUESTS BASED ON A DYNAMIC WRITE THRESHOLD

(71) Applicant: Open Drives LLC, Culver City, CA (US)

(72) Inventors: Scot Gray, Culver City, CA (US); Sean Lee, Culver City, CA (US)

(73) Assignee: Open Drives LLC, Culver City, CA (US)

( * ) Notice: Subject to any disclaimer, the term of this patent is extended or adjusted under 35 U.S.C. 154(b) by 0 days.

(21) Appl. No.: 17/037,108

(22) Filed: Sep. 29, 2020

Related U.S. Application Data

(63) Continuation of application No. 16/896,062, filed on Jun. 8, 2020, now Pat. No. 10,802,762.

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |

(52) U.S. Cl.
CPC .......... *G06F 3/0659* (2013.01); *G06F 3/0604* (2013.01); *G06F 3/0673* (2013.01); *G06F 3/0613* (2013.01)

(58) Field of Classification Search
CPC ..... G06F 3/0659; G06F 3/0604; G06F 3/0613
USPC ........................................................ 711/154
See application file for complete search history.

(56) References Cited

U.S. PATENT DOCUMENTS

| | | | |
|---|---|---|---|
| 2010/0250891 A1 | 9/2010 | Shalev et al. | |
| 2011/0078393 A1 | 3/2011 | Lin | |
| 2012/0047332 A1* | 2/2012 | Bannon | G06F 12/0891 711/135 |
| 2012/0054447 A1* | 3/2012 | Swart | G06F 12/0888 711/136 |
| 2012/0131180 A1 | 5/2012 | Nomura et al. | |
| 2014/0195745 A1* | 7/2014 | Shiratori | G11B 5/00813 711/154 |
| 2015/0121008 A1* | 4/2015 | Boden | G06F 12/0868 711/120 |
| 2015/0347022 A1* | 12/2015 | Ashida | G06F 3/0686 711/113 |

(Continued)

*Primary Examiner* — Edward J Dudek, Jr.
*Assistant Examiner* — Sidney Li
(74) *Attorney, Agent, or Firm* — Ansari Katiraei LLP; Arman Katiraei; Sadiq Ansari

(57) ABSTRACT

An asynchronous storage system may perform asynchronous writing of data from different sets of received non-consecutive synchronous write requests based on a dynamic write threshold that varies according to parameters of the storage device and/or synchronous write request patterns. The asynchronous writing may include coalescing data from a set of non-consecutive write requests in a plurality of received write requests that contain different data for a particular file, issuing a single asynchronous write request with the data that is coalesced from each write request of the set of non-consecutive write requests to the storage device instead of each write request of the set of non-consecutive write requests, and writing the data that is coalesced from each write request of the set of non-consecutive write requests to the storage device with a single write operation that is executed in response to the single asynchronous write request.

18 Claims, 10 Drawing Sheets

(56) References Cited

U.S. PATENT DOCUMENTS

2016/0048529 A1  2/2016  Mathur et al.

* cited by examiner

SYSTEMS AND METHODS FOR ASYNCHRONOUS WRITING OF SYNCHRONOUS WRITE REQUESTS BASED ON A DYNAMIC WRITE THRESHOLD

CLAIM OF BENEFIT TO RELATED APPLICATIONS

This application is a continuation of U.S. nonprovisional application Ser. No. 16/896,062 entitled "Systems and Methods for Asynchronous Writing of Synchronous Write Requests Based on a Dynamic Write Threshold", filed Jun. 8, 2020, now U.S. Pat. No. 10,802,762. The contents of application Ser. No. 16/896,062 are hereby incorporated by reference.

BACKGROUND

Synchronous write requests may include requests for writing data in the order in which the requests are received. A confirmation message may be returned in response to a synchronously issued write request when the data associated with that write request is written to a storage device.

FIG. 1 illustrates synchronous write operation. One or more client devices 110 may issue (at 1 and 1') synchronous write requests 115-1 and 115-2 (sometimes collectively referred to as "synchronous write requests 115" or individually as "synchronous write request 115") in a serial fashion over a network to synchronous storage system 120. Each synchronous write request 115 may contain approximately 1 kilobyte ("KB") because of the maximum transmission unit ("MTU") and/or other restrictions for synchronous write requests 115 that are issued over a network.

Synchronous storage system 120 may receive each synchronous write request 115 after some transmission delay, may perform (at 2 and 2') a separate write operation for each synchronous write request 115 in order to write the 1 KB of data to one or more storage devices 130. Storage devices 130 may provide (at 3 and 3') a confirmation message to synchronous storage system 120 to indicate that the data has been stored, and synchronous storage system 120 may provide (at 4 and 4') a confirmation message to client devices 110 to indicate that synchronous write requests 115 were successfully completed.

Depending on a number of supported outstanding synchronous write requests, client devices 110 may delay issuing (at 1') second synchronous write request 115-2 until receiving (at 4) notification from synchronous storage system 120 that first synchronous write request 115-1 was successfully written (at 3) to storage devices 130. In other words, synchronous write operation may cause client devices 110 to halt transmission of a next synchronous write request until synchronous storage system 120 confirms successfully completing one or more previously issued synchronous write requests.

The synchronous write operation may result in degraded storage performance when issuance and/or performance of a synchronous write request is delayed for at least the round-trip-time ("RTT") to issue and store data from prior synchronous write requests. The storage performance is further degraded when the issued synchronous write requests contain less data than can be written by storage devices 130 with each write operation. For instance, storage devices 130 may write data in 1 megabyte ("MB") blocks or records with each write operation, and the synchronous write requests being issued by client devices 110 and/or synchronous storage system 120 may contain only 1 KB of data due to network segmentation (e.g., MTU and/or other restrictions for network-based file storage and/or file access). In this example, it may take 10 synchronous write requests and the RTT time for each of the 10 synchronous write requests to store 1 MB of data that could otherwise be written with a single write operation.

DETAILED DESCRIPTION OF PREFERRED EMBODIMENTS

The following detailed description refers to the accompanying drawings. The same reference numbers in different drawings may identify the same or similar elements.

Provided are systems and methods for asynchronous writing of synchronous write requests based on a dynamic write threshold. The asynchronous writing of synchronous write requests may include an asynchronous storage system that defines the dynamic write threshold based on operational and performance parameters of storage devices that are used to store the data contained in the synchronous write requests. The asynchronous storage system maximizes storage performance by providing confirmation messages to client devices upon receiving the synchronous write requests from the client devices. The client devices may then issue additional synchronous write requests and/or perform other tasks while the asynchronous storage system coalesces and/or batches data from different sets of the received synchronous writes requests to satisfy the dynamic write threshold, and issues data from a batched set of requests as a single write operation that maximizes the amount of data that is written by the storage devices with each executed write operation. Consequently, the client devices may receive a near-instantaneous execution of the synchronous write requests from the asynchronous storage system, and/or receive write performance orders of magnitude greater than what is possible with the synchronous write operation illustrated by prior art FIG. 1.

Figure 2:
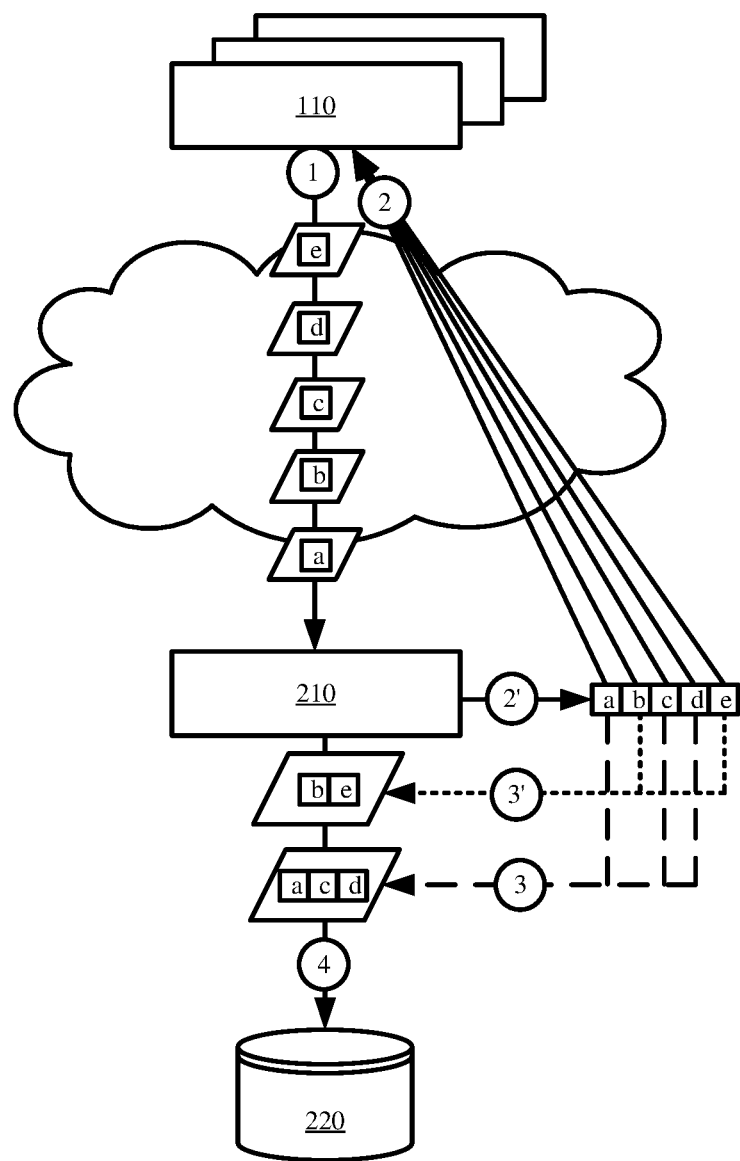
FIG. 2 illustrates asynchronous write operation in accordance with some embodiments presented herein.

FIG. 2 illustrates the asynchronous write operation in accordance with some embodiments presented herein. FIG. 2 may include client devices 110, asynchronous storage system 210, and one or more storage devices 220 that are under control of asynchronous storage system 210 and that are used to store the data of client devices.

Client devices 110 may issue (at 1) a plurality of synchronous write requests to asynchronous storage system 210. Client devices 110 may issue (at 1) the synchronous write requests over a network to asynchronous storage system 210. Each synchronous write request may include a portion or segment of data from a file. Specifically, client devices 110 may segment the data of a particular file to fit within the payload of the data packets that are used to transmit the data over the network to asynchronous storage system 210 (e.g., to adhere to the maximum transmission unit ("MTU") and/or other restrictions of the network protocol used to transmit the data). Each data packet may correspond to a different synchronous write request. Synchronous write requests from different client devices 110 may become intermixed in the issued (at 1) plurality of synchronous write requests, and/or synchronous write requests for different files from the same client device 110 may become intermixed in the issued (at 1) plurality of synchronous write requests. Consequently, data for the same file may arrive in non-consecutive requests of the plurality of synchronous write requests.

Upon receiving each synchronous write request, asynchronous storage system 210 may provide (at 2) a client device 110, that issued that synchronous write request, a confirmation message in reply, and may cache (at 2') that synchronous write request or the contained file data to a local cache or buffer. The confirmation message may notify the issuing client device 110 that the synchronous write request was successfully completed even though the contained data may yet be written to or stored by a destination storage device 220 of asynchronous storage system 210, wherein the destination storage device 220 may be identified in the synchronous write request by a Uniform Resource Identifier ("URI"), metadata, and/or other identifier.

In response to receiving (at 2) the confirmation messages, client devices 110 may issue additional synchronous write requests and/or perform other tasks or operations that may be dependent on successful completion or execution of the earlier issued (at 1) synchronous write requests. Client devices 110 may issue the additional synchronous write requests and/or perform other tasks or operations without waiting for storage devices 220 of asynchronous storage system 210 to become available, asynchronous storage system 210 issuing a write operation to write the data of a synchronous write request to storage devices 220, and/or storage devices 220 to write the data and confirm that the data has been successfully written before asynchronous storage system 210 may issue the confirmation message for that synchronous write request. From the perspective of client devices 110, the synchronous write requests are completed essentially in real-time with only the round-trip network latency for issuing (at 1) the synchronous write requests and receiving (at 2) the confirmation messages.

Figure 1:
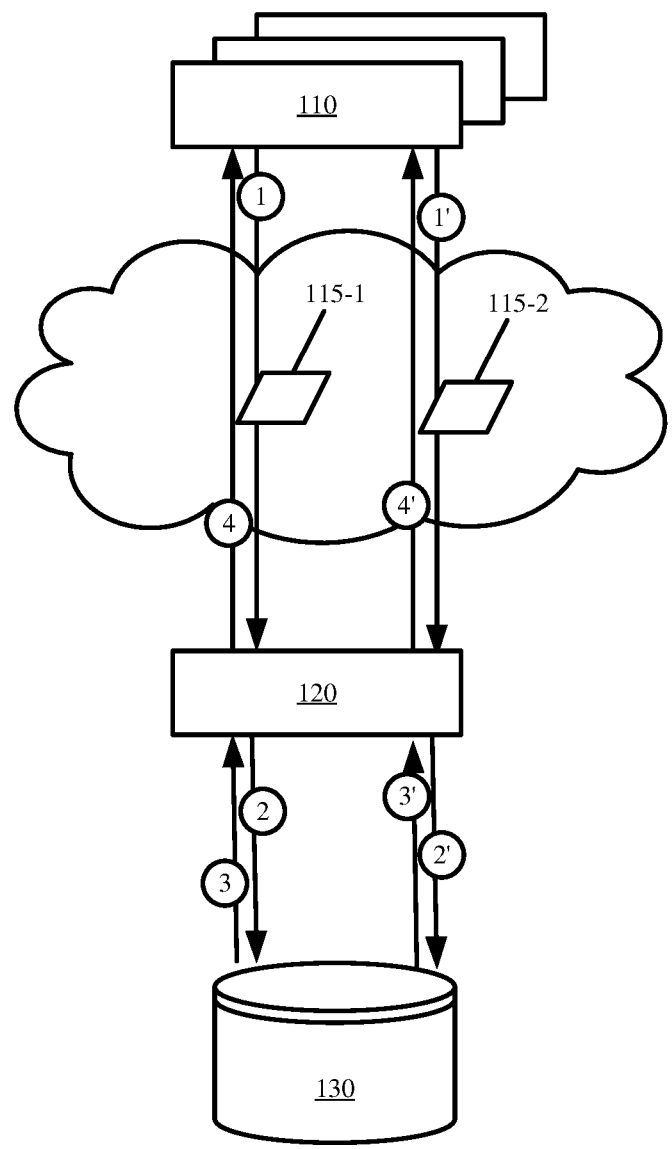
FIG. 1 illustrates synchronous write operation.

Asynchronous storage system 210 may also improve the actual write performance and/or time to write the data from the plurality of synchronous write requests to storage devices 220 relative to the synchronous write operation illustrated in FIG. 1 in which each synchronous write request becomes an independent write operation. As shown in FIG. 2, asynchronous storage system 210 may group (at 3 and 3') data from different mutually exclusive sets of the plurality of received synchronous write requests until the write threshold, that is dynamically determined by asynchronous storage system 210 for a targeted storage device 220, is satisfied. In grouping the data from different sets of write requests, asynchronous storage system 210 may reorder and combine execution of the synchronous write requests into fewer write operations. For instance, asynchronous storage system 210 may coalesce and/or batch together data from non-consecutive synchronous write requests issued by a particular client device 110 and/or the data from non-consecutive synchronous write requests that contain different data for the same file. In other words, asynchronous storage system 210 may reassemble the data of a particular file from data fragments of that particular file found in non-consecutive synchronous write requests. More specifically, asynchronous storage system 210 may reassemble the data from two or more of the received synchronous write requests until there is enough data to satisfy the dynamic write threshold for the target storage device 220, and asynchronous storage system 210 may issue (at 4) the reassembled data as one asynchronous write request that the target storage device 220 can complete with a single write operation. For instance, asynchronous storage system 210 may batch together 1 KB data from 1,000 non-consecutive synchronous write requests for the same file in order to generate and execute a single 1 MB write operation, in place of 1,000 independent 1 KB write operations, based on the dynamic write threshold being defined according to the target storage device 220 being able to write a 1 MB block or record with every write operation.

In some embodiments, asynchronous storage system 210 may dynamically modify the write threshold for each storage device 220 as the performance and/or capabilities of each storage device 220 changes over time. The storage device performance and/or capabilities may change in response to changing amounts of available storage, changing load, changing mix of read requests versus write requests, storage device hardware or software changes, changing network latency for accessing the storage device, etc. Asynchronous storage system 210 may also modify the write threshold for each storage device based on different request patterns (e.g., changing data sizes, burst patterns, etc.) and/or other changes that may impact the write performance of asynchronous storage system 210.

Figure 3:
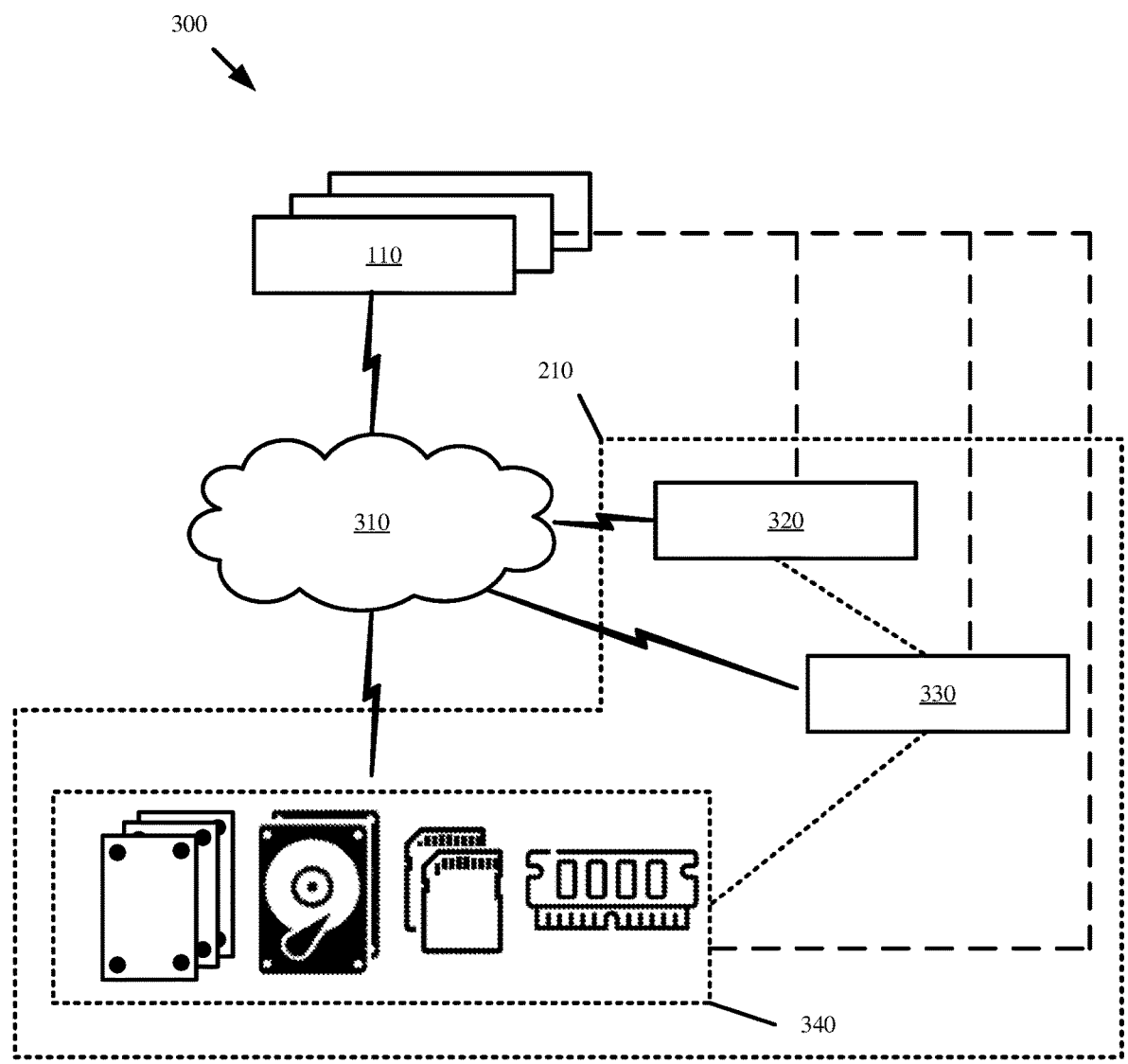
FIG. 3 illustrates an example environment in which an asynchronous storage system may be used for asynchronous writing of data into storage devices in accordance with some embodiments presented herein.

FIG. 3 illustrates an example environment 300 in which asynchronous storage system 210 may be used for asynchronous writing of data into storage devices 220 in accordance with some embodiments presented herein. Environment 300 may include client devices 110, asynchronous storage system 210, and network 310.

Client devices 110 may include network-enabled user equipment, machines, or devices that interface with asynchronous storage system 210 for local and/or network file access. More specifically, client devices 110 may include any computer or device that generates data, and that relies on asynchronous storage system 210 to manage storage and/or access to the data across different storage devices. The data may be generated by one or more applications running on client devices 110, and the storage operations may include reading and/or writing the data.

Asynchronous storage system 210 may include write controller 320, one or more file systems 330, and storage devices 340. Asynchronous storage system 210 may support any number of distributed file system protocols for reading, writing, and/or accessing files over network 310. For instance, asynchronous storage system 210 may support Network File System ("NFS"), Server Message Block ("SNB"), HyperText Transfer Protocol ("HTTP"), Representational State Transfer ("REST"), and/or other messaging and protocols for network file access including issuing and responding to write requests.

In some embodiments, asynchronous storage system 210 may run independent and remote from client devices 110. In some such embodiments, client devices 110 may use standard and/or supported network file access protocols and messaging to write data to asynchronous storage system 210. In other words, client devices 110 may use existing network protocols and operating systems, without any specialized software or changes to client devices 110, to interface with asynchronous storage system 210.

In some embodiments, one or more components of asynchronous storage system 210 may be distributed and run locally on client devices 110. For instance, write controller 320 and/or file system 330 may execute on each client device 110, and the locally running instances of write controller 320 and/or file system 330 may access storage devices 340 via network 310.

Write controller 320 may receive the synchronous write requests from one or more client devices 110. Write controller 320 may use Random Access Memory ("RAM"), flash memory, solid state disk ("SSD"), or other high-performance storage media to cache the synchronous write requests. Write controller 320 may provide the confirmation message upon receiving a write request from a client device 110 or an application, code, or other service running on that client device 110. Write controller 320 may batch and/or reorder the write requests according to a write threshold that is dynamically determined for a particular storage device 340.

Write controller 320 may provide asynchronous write requests with data that is batched from different sets of non-consecutive synchronous write requests issued by client devices 110, to one or more file systems 330. In particular, write controller 320 may coalesce data from a set of non-consecutive write requests from client devices 110 until the dynamic write threshold is satisfied, may aggregate the data, that is to be written, from the set of write requests into a single asynchronous write request, and may issue the single asynchronous write request, instead of the set of write requests, to one or more file systems 330.

Each file system 330 may establish the interface to one or more storage devices 340, and/or may command and control those one or more storage devices 340. For instance, file system 330 may issue write and/or read operations to storage devices 340 for execution, and may ensure that storage devices 340 write or return the correct data in response to the operations. File system 330 may be based on the ZFS file system or another file system.

In some embodiments, file system 330 may operate on a device that is separate from or local to client devices 110. In some embodiments, file system 330 may run with write controller 320 directly on each client device 110 (e.g., as a process, service, or operating system component).

Storage devices 340 may include solid state disks, flash memory, optical storage devices, and/or other fast performing storage devices that store and/or access data without moving components. Storage devices 340 may include magnetic disks, storage devices that write to physical media, mechanical storage devices, and/or other slow performing storage devices that store and/or access data via moving components.

Asynchronous storage system 210 may scale to include any number, combination, and/or type of storage device 340. For instance, storage devices 340 may include three fast performing storage devices and two slow performing storage devices with the fast and/or slow storage devices coming from different manufacturers, having different storage capacities, and/or providing different storage performance.

Other factors, besides the underlying storage technology, may affect the storage performance of storage devices 340. For instance, network latency for communications between file system 330 and storage devices 340 may impact availability and/or performance of storage devices 340. Similarly, a first storage device that has a lower percentage of unused capacity (e.g., a greater percentage of used capacity) than an otherwise identical second storage device may be slower performing because the second storage device is able to perform more sequential writes, whereas the first storage device may have to perform slower random writes to non-sequential blocks.

Using different block and/or record sizes to read and write data may also affect performance of otherwise identical storage devices 340. Performance of storage devices 340 may also be affected based on the input/output stream or sequence of storage operations that are generated. For instance, a sequence of read operations may be issued and may target data that is stored to a first storage device, thereby making that first storage device unavailable for write operations until the read operations are completed.

In some embodiments, storage devices 340 may be local to and/or running on the same machine or device as write controller 320, file system 330, and/or asynchronous storage system 210. In some embodiments, storage devices 340 may be connected to write controller 320, file system 330, and/or asynchronous storage system 210 with high speed and/or high bandwidth interfaces. Examples of interfaces for directly connecting storage devices 340 to file system 330 and/or asynchronous storage system 210 may include advanced technology attachment (ATA), small computer system interface (SCSI), serial attached SCSI (SAS), and/or peripheral component interconnect express (PCIe).

In some embodiments, storage devices 340 may operate as one or more storage nodes that are remote from the devices on which write controller 320, file system 330, and/or client devices 110 run. In some such embodiments, write controller 320, file system 330, and/or client devices 110 may access storage devices 340 via network 310.

Network 310 may include a packet-switched data network, a Local Area Network ("LAN"), a Wide Area Network ("WAN"), or network of networks (e.g., the Internet). Network 310 may support gigabit speeds (e.g., 1, 10, 100 gigabits per second), and may therefore have sufficient speeds to exceed the storage performance of each individual storage device 340, and/or the collective set of storage devices 340. Ethernet, fiber channel, and/or other networking technologies may be used to connect client devices 110 to asynchronous storage system 210 and/or to connect file system 330 to storage devices 340.

The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3. For instance, in some embodiments, write controller 320 may directly interface with storage devices 340, and may directly issue asynchronous write requests or write operations to storage devices 340. In some embodiments, asynchronous storage system 210 may have a distributed implementation in which one or more of write controller 320, file system 330, and storage devices 340 may be run as part of each client device 110. In some such embodiments, multiple distributed instances of write controller 320 may interface with and/or interact with file system 330. Alternatively, or additionally, one or more of the devices of environment 300 may perform one or more functions described as being performed by another one or more of the devices of environment 300. For instance, the functions and operations of write controller 320 and file system 330 may be integrated into a single device or component.

Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

Asynchronous storage system 210 may alter the asynchronous write operation by dynamically changing the write thresholds that control the formation of the asynchronous write requests or write operations. In some embodiments, asynchronous storage system 210 may set a different write threshold for each storage device 340 based on queried operational and/or performance parameters of that storage device 340. In some embodiments, asynchronous storage system 210 may change the write threshold that is set for a particular storage device 340 based on the queried operational and/or performance parameters of that particular storage device 340 changing over time.

Figure 4:
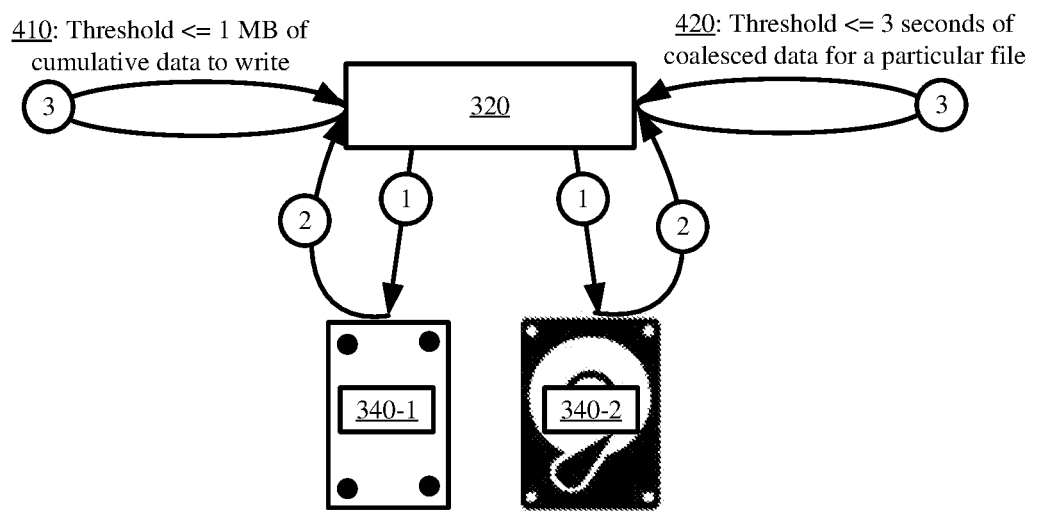
FIG. 4 illustrates an example of the asynchronous storage system dynamically setting the write threshold for different storage devices based on the operational and/or performance parameters of those storage devices in accordance with some embodiments presented herein.

FIG. 4 illustrates an example of asynchronous storage system 210 dynamically setting the write threshold for different storage devices 340 based on the operational and/or performance parameters of those storage devices 340 in accordance with some embodiments presented herein. As shown in FIG. 4, write controller 320, via file system 330 or independent of file system 340, may provide (at 1) a set of queries to storage device 340-1 and storage device 340-2 (sometimes collectively referred to as "storage devices 340" or individually as "storage device 340") prior to commencing the asynchronous write operation (e.g., before receiving write requests from client devices 110) and/or periodically during the asynchronous write operation (e.g., while receiving write requests from client devices 110).

The queries may be used to determine the operational and/or performance parameters of each storage device 340. The queries may analyze storage device firmware, may scan storage device configuration parameters, may submit requests to the storage device controller, and/or may invoke storage device functions or operations to determine the storage device operational and/or performance parameters. For instance, the queries may determine the block size used by each storage device 340 to complete each write operation, the speed at which each storage device 340 completes a write operation, available storage on each storage device 340, storage device 340 seek times, storage device 340 fragmentation, storage device 340 buffer, and/or amount of data that a storage device 340 can write in the event of a power failure and/or other outage based on available power reserves. Each storage device 340 may have different capacitors and/or backup power supplies that can be used in the event of a power failure and/or other outage to write out different amounts of data.

In some embodiments, the operational and/or performance parameters may be derived from querying the storage device 340 make and model, the running firmware version, the connection interface to that storage device 340, and/or data. In some embodiments, the operational and/or performance parameters may be determined from testing storage devices 340. For instance, write controller 320 may generate a test set of write requests that write controller 320 sends to each storage device 340. Write controller 320 may track how and when each storage device 340 responds to the test set of write requests in order to derive the operational and/or performance parameters of each storage device 340. In particular, write controller 320 may determine optimal operation and/or performance of each storage device 340 by varying the size, frequency, and/or other properties write requests that are sent to each storage device 340. For instance, the fastest write performance of first storage device 340-1 may occur when write controller 320 issues 1 MB of data with each write request, whereas the fastest write performance of second storage device 340-2 may occur when write controller 320 issues 512 KB of data with each write request.

In response to the queries, write controller 320 may obtain (at 2) operational and/or performance parameters for each storage device 340. Write controller 320 may configure (at 3) first write threshold 410 for first storage device 340-1 that is different than second write threshold 420 configured for second storage device 340-2 based on the different operational and/or performance parameters obtained for each storage device 340. In some embodiments, write controller 320 may define the dynamic write thresholds using cumulative data sizes, time, request counts, and/or other criteria.

As shown in FIG. 4, write controller 320 may configure first write threshold 410 as a size-based threshold. For instance, write controller 320 may define first write threshold 410 based on first storage device 340-1 being configured with a block or record size of 1 MB, and writing up to 1 MB of data with each write operation. Accordingly, first write threshold 410 for first storage device 340-1 may cause write controller 320 to coalesce up to 1 MB of data from two or more synchronous write requests, and may issue a single asynchronous write request and/or perform a single write operation based on the cumulative data from two or more synchronous write requests satisfying first write threshold 410.

Write controller 320 may configure second write threshold 420 as a time-based threshold that is triggered after 3 seconds. From the operational and/or performance parameters obtained for storage device 340-2 and/or from incoming synchronous write request patterns, write controller 320 may determine that optimal performance of second storage device 340-2 is achieved with second storage device 340-2 receiving write operations at 3 second intervals. For instance, write controller 320 may determine that it takes 3 seconds on average for a particular client device or particular connection to provide synchronous write requests that cumulatively contain enough data for a particular file that can be written out with a single write operation.

Figure 5:
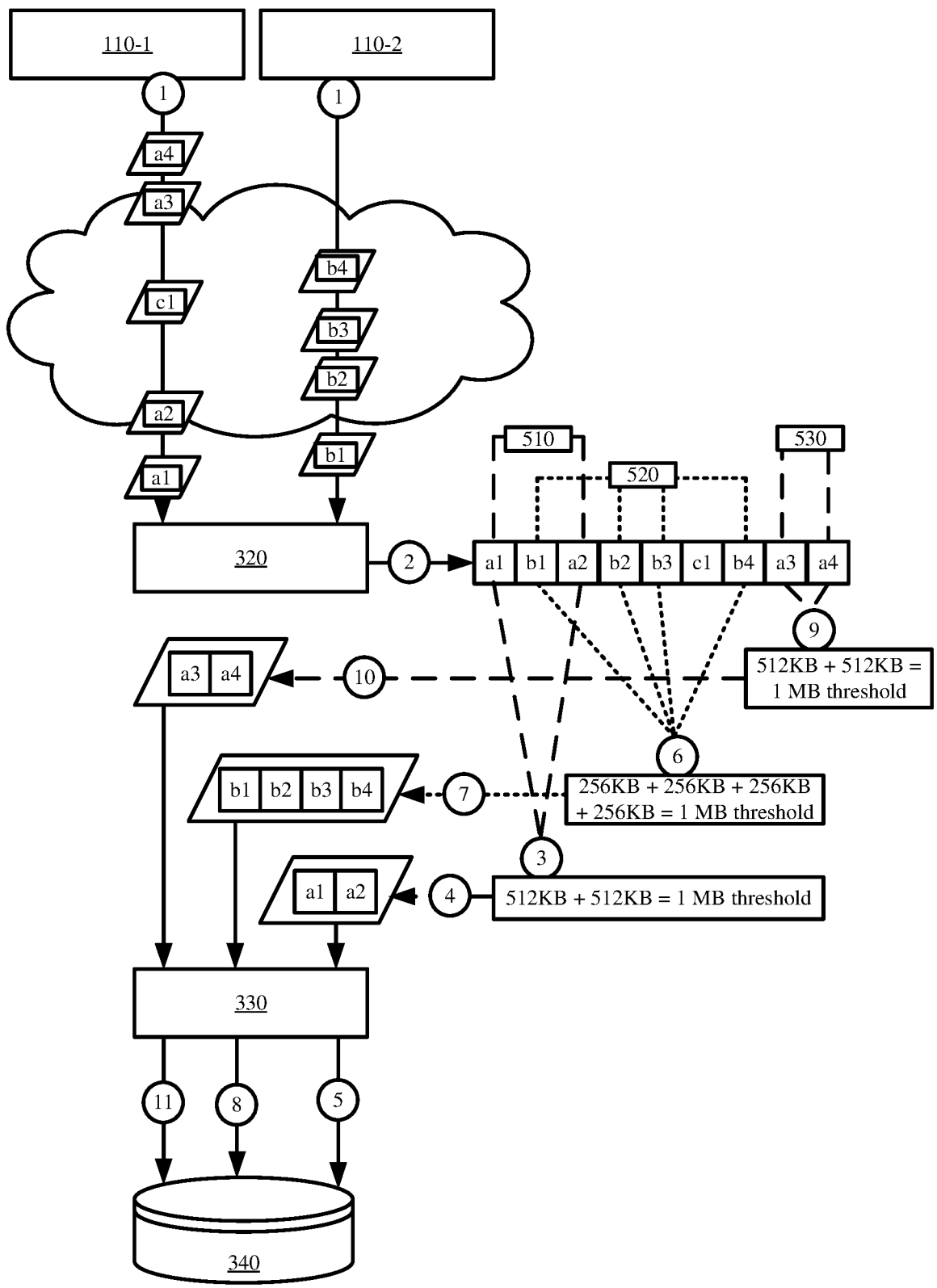
FIG. 5 illustrates an example of a write controller coalescing a set of non-consecutive synchronous write requests into a single asynchronous write request that is issued in place of a set of non-consecutive synchronous once a write threshold is satisfied in accordance with some embodiments presented herein.

Once a write threshold has been configured for a storage device, write controller 320 may coalesce and/or batch data from two or more synchronous write requests into a single asynchronous write request that satisfies the write request threshold for that storage device before issuing the asynchronous write request in place of the individual coalesced write requests to that storage device. FIG. 5 illustrates an example of write controller 320 coalescing a set of non-consecutive synchronous write requests into a single asynchronous write request that is issued in place of a set of non-consecutive synchronous once a write threshold is satisfied in accordance with some embodiments presented herein.

FIG. 5 illustrates write controller 320 receiving (at 1) an intermixed plurality of synchronous write requests from client devices 110-1 and 110-2 (sometimes collectively referred to as "client devices 110" or individually as "client device 110"). As shown, write controller 320 receives a first write request with a first 512 KB data for a first file from client device 110-1 ("a1"), a second write request with a first 256 KB of data for a second file from client device 110-2 ("b1"), a third write request with a second 512 KB of data for the first file from client device 110-1 ("a2"), a fourth write request with a second 256 KB data for the second file from client device 110-2 ("b2"), a fifth write request with a third 256 KB of data for the second file from client device 110-2 ("b3"), a sixth write request with a first 512 KB of data for a third file from client device 110-1 ("c1"), a seventh write request with a fourth 256 KB of data for the second file from client device 110-2 ("b4"), an eighth write request with a 512 KB of third data for the first file from client device 110-1 ("a3"), and a ninth write request with a fourth 512 KB of data for the first file from client device 110-1 ("a4") in that order. Write controller 320 may provide (not shown) a confirmation message as each write request is received, and/or may cache (at 2) the data in the order the data is received to local memory or storage.

Write controller 320 may coalesce the data into different sets until a write threshold is satisfied. Each set may include data from consecutive or non-consecutive write requests that are issued by a specific client device 110 or a specific connection established with a specific client device 110. In some embodiments, write controller 320 may coalesce the data from the received write requests so that each set includes additional data segments of the same file.

Write controller 320 may identify the sending client device for each request based on the source Internet Protocol ("IP") address and/or other identifiers in the write request header, metadata, and/or body. Write controller 320 may identify the file that is the target of the write request data based on a URI, metadata, and/or other identifier associated with the write request.

In FIG. 5, the write threshold is satisfied once a set reaches a cumulative 1 MB of data. Accordingly, write controller 320 may determine that first set 510 satisfies the write threshold upon coalescing (at 3) the first 512 KB of data for the first file from the first write request and the second 512 KB of data for the first file from the third write request. Write controller 320 may generate a first 1 MB asynchronous write request based on the coalesced first 512 KB of data for the first file from the first write request and the second 512 KB of data for the first file from the third write request, and may issue (at 4) the first 1 MB asynchronous write request, in place of the first write request and the third write request, to file system 330, and file system 330 may provide (at 5) storage device 340 with a first asynchronous write operation to execute based on the first asynchronous write request.

Write controller 320 may determine that second set 520 satisfies the write threshold upon coalescing (at 6) the first 256 KB of data for the second file from the second write request, the second 256 KB of data for the second file from the fourth write request, the third 256 KB of data for the second file from the fifth write request, and the fourth 256 KB of data for the second file from the seventh write request. Write controller 320 may generate a second 1 MB asynchronous write request based on the coalesced of data for the second file from the second, fourth, fifth, and seventh write requests, and may issue (at 7) the second 1 MB asynchronous write request, in place of the second, fourth, fifth, and seventh write requests, to file system 330, and file system 330 may provide (at 9) storage device 340 with a second asynchronous write operation to execute based on the second asynchronous write request.

A third 1 MB asynchronous write request may be generated in response to coalescing (at 9) the third 512 KB of data for the first file from the eighth write request and the fourth 512 KB of data for the first file from the ninth write request into third set 530, and the aggregate data for third set 530 satisfying the write threshold. Accordingly, write controller 320 may issue (at 10) the third 1 MB asynchronous write request, in place of the eighth and ninth write requests, to file system 330, and file system 330 may provide (at 11) storage device 340 with a third asynchronous write operation based on the third asynchronous write request.

Once the data from each asynchronous write request is written to storage device 340, storage device 340 may provide a confirmation message, and file system 330 and/or write controller 320 may receive the confirmation message. In response to each confirmation message, the data for the asynchronous write request and/or synchronous write requests that resulting in the confirmation message may be removed from the write controller 320 cache.

If a confirmation message is not received within a threshold amount of time of issuing an asynchronous write request or asynchronous write operation, write controller 320 and/or file system 330 may determine that the targeted storage device is experiencing an error or failure. In response to not receiving the confirmation message within the threshold amount of time, write controller 320 and/or file system 330 may reissue the asynchronous write request or operation to the same or a different storage device until the data is successfully written by storage device 340.

In some embodiments, write controller 320 may retain the data for the third file ("c1") in cache until write controller 320 receives additional data for the third file to satisfy the write threshold. In some embodiments, the write threshold may be defined with a time trigger in addition to or instead of the size trigger, that is used to control the asynchronous writing illustrated in FIG. 5. The time trigger of the write threshold may ensure that the data for the third file eventually is written to storage device 340 even if the cumulative data for the third file is insufficient to satisfy the size trigger of the write threshold. More generally, the time trigger may be used to ensure that no synchronous write requests are kept from storage devices 340 for an indefinite amount of time, and that all requests are eventually written to storage devices 340. Accordingly, the write threshold may be defined with different conditions and/or triggers that may be independently satisfied, and write threshold may be satisfied and may cause write controller 320 to issue an asynchronous write request with the data from one or more write requests based on whichever one or more defined conditions and/or triggers of the write threshold are satisfied first.

Figure 6A:
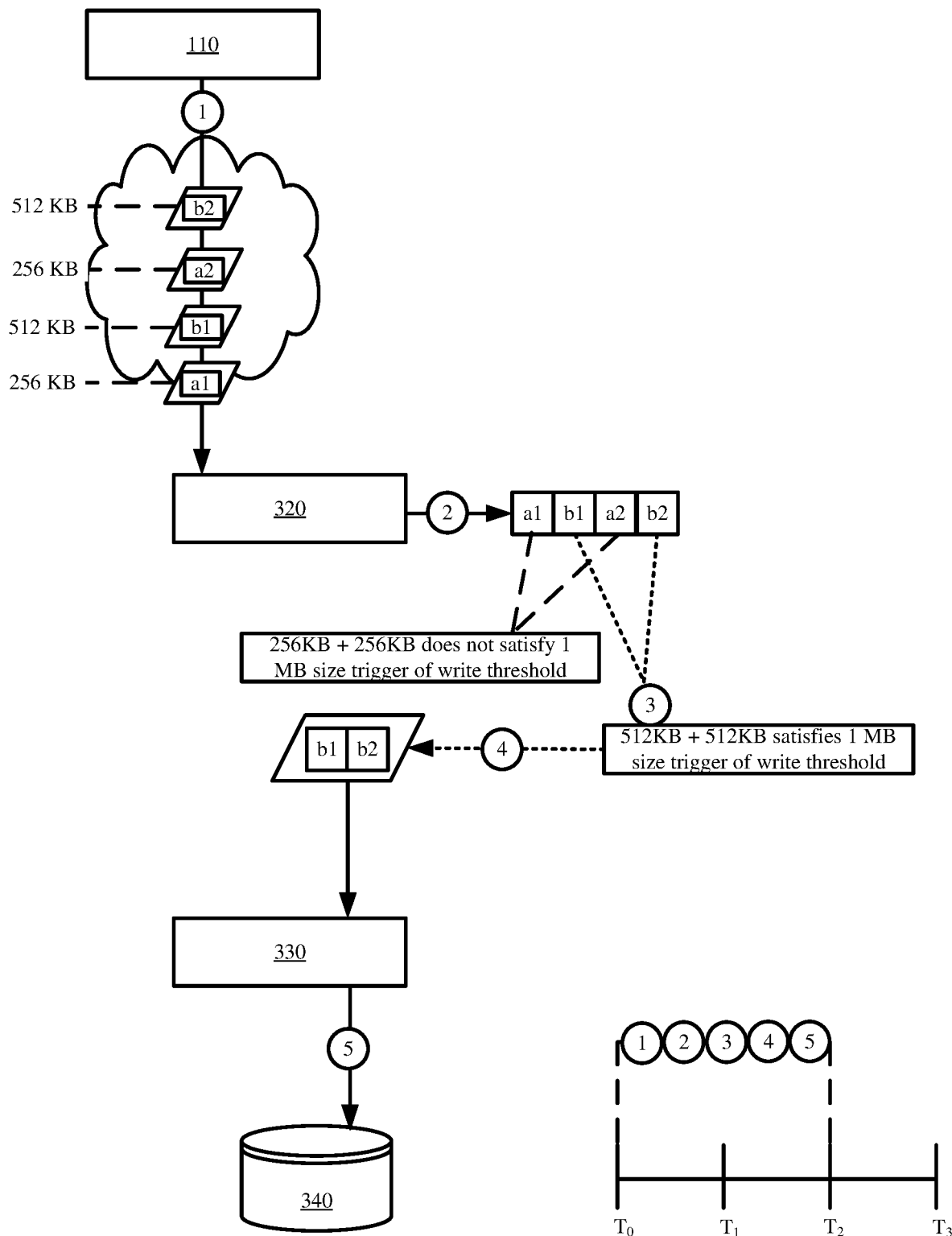
FIGS. 6A and 6B illustrate an example of the write controller dynamically issuing asynchronous write requests for different sets of a plurality of received synchronous write requests based on different triggers of a write threshold being satisfied in accordance with some embodiments presented herein.
Figure 6B:
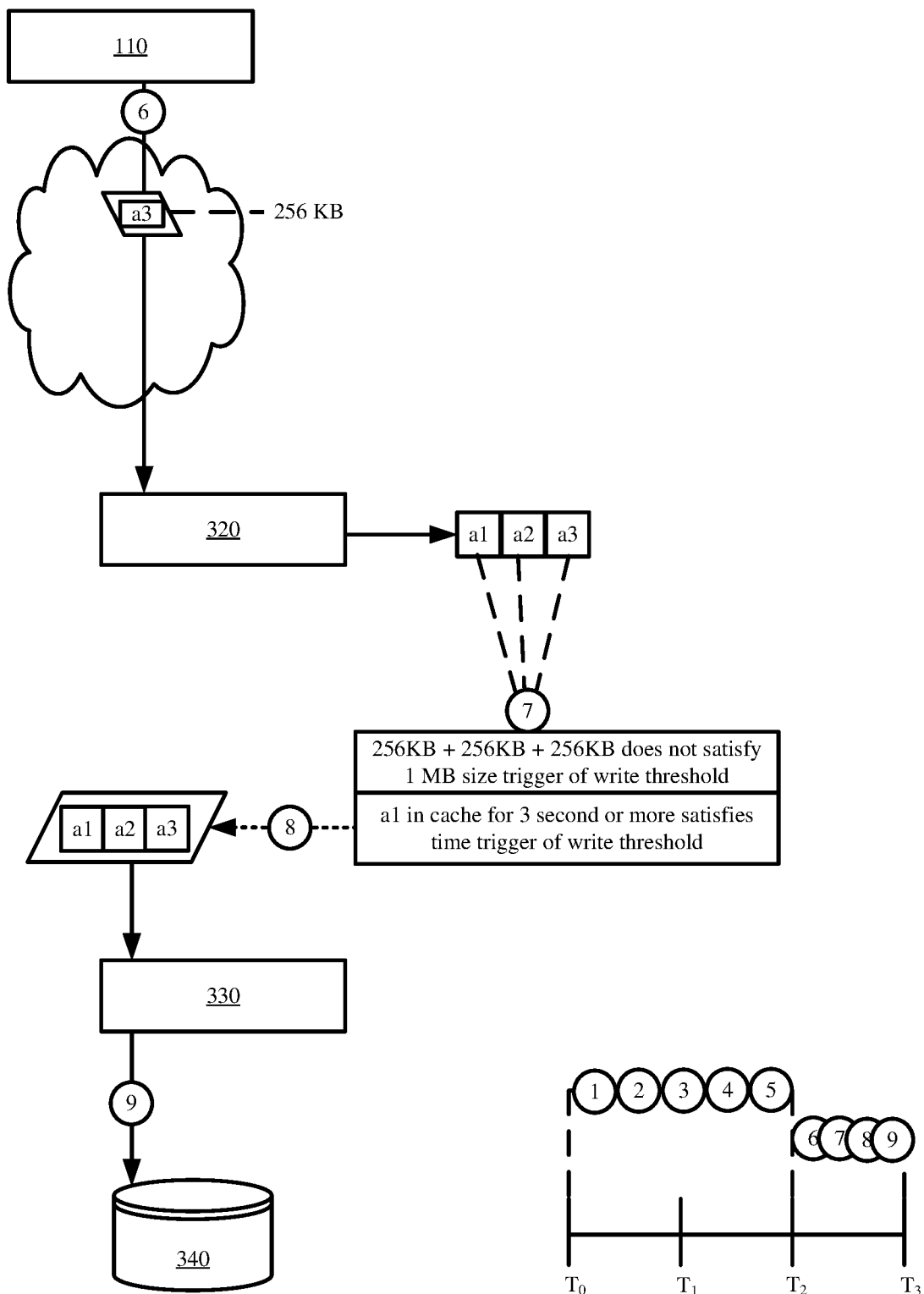

FIGS. 6A and 6B illustrate an example of write controller 320 dynamically issuing asynchronous write requests for different sets of a plurality of received synchronous write requests based on different triggers of a write threshold being satisfied in accordance with some embodiments presented herein. In FIGS. 6A and 6B, write controller 320 may issue asynchronous write requests for different sets of synchronous write requests based on a 1 MB size trigger being satisfied and/or a 3 second time trigger being satisfied.

As shown in FIG. 6A, write controller 320 may receive (at 1) an intermixed plurality of synchronous write requests from client devices 110. For instance, write controller 320 may receive a first write request with a first 256 KB of a first file ("a1"), a second write request with a first 512 kb of a second file ("b1"), a third write request with a next 256 KB of the first file ("a2"), and a fourth write request with a next 512 KB of the second file ("b2") during a 2 second interval. Write controller 320 may provide (not shown) a confirmation message as each write request is received from a client device 110, and/or may cache (at 2) the data to local memory or storage in the order the write requests are received.

Write controller 320 may coalesce the data into different sets that contain different data for the same file. Upon receiving the fourth write request, write controller 320 may determine (at 3) that the batched data from the second write request and the fourth write request satisfy the 1 MB size trigger for the write threshold. Write controller 320 may generate and issue (at 4) an asynchronous write request, that may include 1 MB of the second file data that is coalesced from the second write request and the fourth write request, to file system 330, and file system 330 may instruct (at 5) storage device 340 to perform a write operation that includes the coalesced data from the asynchronous write request.

As shown in FIG. 6B, corresponding to a subsequent 1 second interval that immediately follows the 2 second interval of FIG. 6A, write controller 320 may receive a fifth write request with a next 256 KB of the first file ("a3"). The coalesced first file data from the first request, the third request, and the fifth request may total 768 KB which is less than the size trigger of the write threshold.

However, write controller 320 may determine (at 7) that 3 seconds has passed since receiving the first write request with first data for the first file, and that the time trigger of the write threshold has been satisfied as a result. Write controller 320 may then generate and provide (at 8) an asynchronous write request based on the 768 KB of data that has been coalesced for the first file based on the first, third, and fifth write requests received from client devices 110 over the 3 second interval. In some embodiments, write controller 320 may provide (at 8) the asynchronous write request to file system 330, and file system 330 may instruct (at 9) storage device 340 to perform a write operation that includes the 768 KB of coalesced data from the asynchronous write request. In some embodiments, write controller 320 may directly provide the asynchronous write request or operation to storage device 340 for execution (e.g., when write controller 320 and file system 330 are combined to operate as a single device or component). In any case, the first file data is not retained past the time trigger condition of the write threshold (e.g., a 3 second interval) in the event that there are insufficient write requests to satisfy the size trigger condition of the write threshold.

Figure 7:
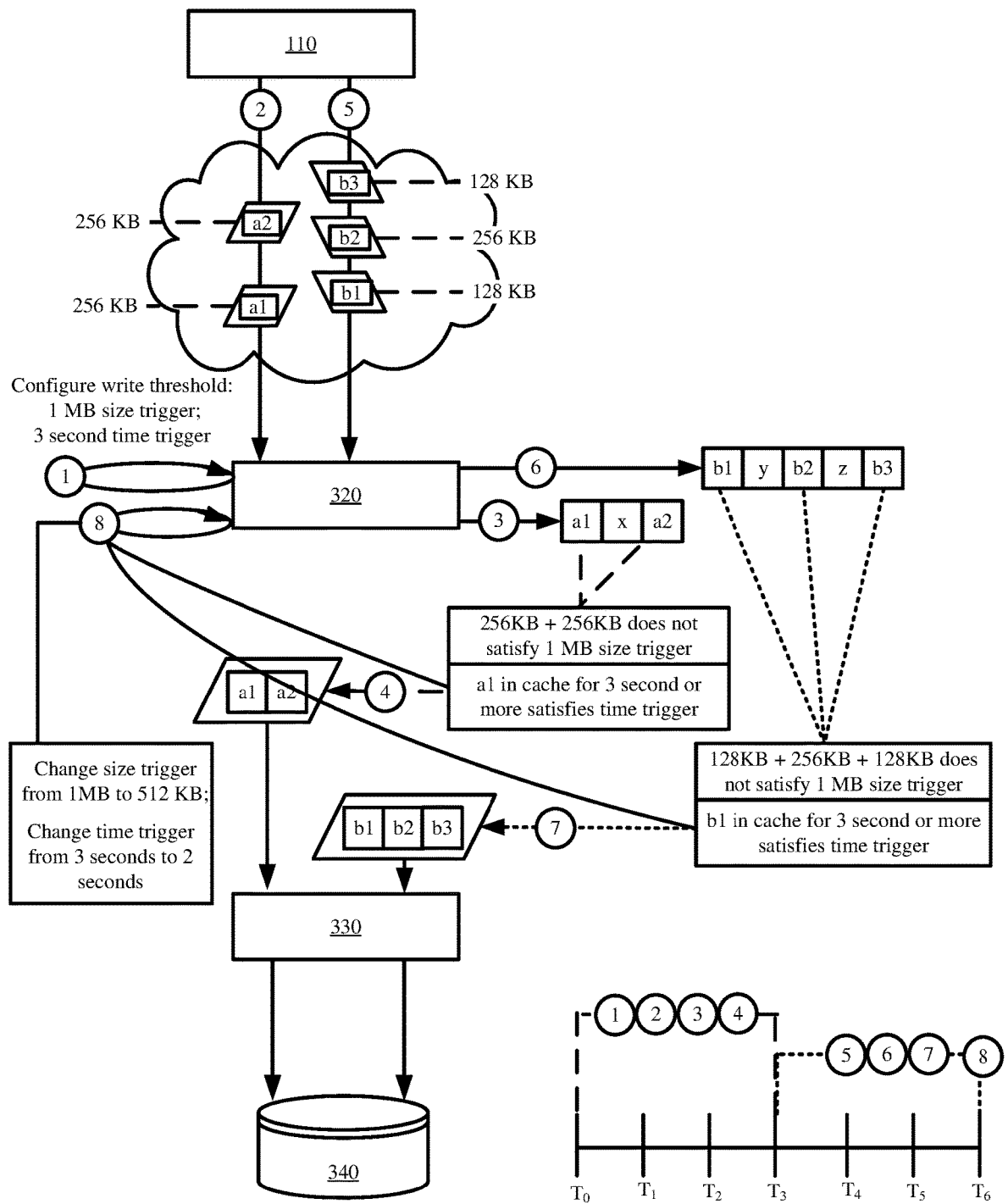
FIG. 7 illustrates an example of the asynchronous storage system dynamically modifying the write threshold to optimize the asynchronous write operation in accordance with some embodiments presented herein.

Asynchronous storage system 210 via write controller 320 may dynamically modify the write threshold(s) based on changes in the operational and/or performance parameters of storage device 340, and also based on changes in the request pattern or request behavior of client devices 110. FIG. 7 illustrates an example of asynchronous storage system 210 dynamically modifying the write threshold to optimize the asynchronous write operation in accordance with some embodiments presented herein.

Write controller 320 may initially configure (at 1) the size trigger of the write threshold to 1 MB, and may configure the time trigger of the write threshold to 3 seconds. Write controller 320 may monitor the synchronous write requests that are issued by client devices 110 over time to determine the write request pattern and/or behavior.

As shown in FIG. 7, write controller 320 may receive (at 2) and/or cache (at 3) two non-consecutive synchronous write requests ("a1" and "a2") that total 512 KB of coalesced data for a first file from a particular connection or client device 110 during a first 3 second interval. Although not shown, the two non-consecutive synchronous write requests may be intermixed with other synchronous write requests that issued by client devices 110 during the same 3 second interval.

The first and third requests do not satisfy the size trigger of the write threshold. After the 3 second interval, the time trigger of the write threshold is met, and write controller 320 may generate (at 4) a first asynchronous write request to send to file system 330 and/or storage devices 340 in place of the two non-consecutive synchronous write requests.

Over a next 3 second interval, write controller 320 may receive (at 5) and/or cache (at 6) three non-consecutive synchronous write requests that total 512 KB of coalesced data for a second file ("b1", "b2", and "b3"). The time trigger of the write threshold is again triggered before the size trigger, and write controller 320 may generate and provide (at 7) a second asynchronous write request to send to file system 330 and/or storage devices 340 in place of the three non-consecutive synchronous write requests.

Write controller 320 may use machine learning and/or artificial intelligence to determine (at 8) that the time trigger and/or size trigger are too large based on the current incoming write request pattern. In particular, write controller 320 may monitor the incoming synchronous client requests and the issued asynchronous write requests over the two 3 second intervals, may account for network latency and/or storage device 340 performance, and at the end of the second 3 second interval, write controller 320 may determine (at 8) that the asynchronous write requests are issued based on the time trigger and not the size trigger because the size trigger is too large for the current request pattern. In determining (at 8) that the write threshold triggers are too large, write controller 320 may dynamically adjust (at 8) one or more of the write threshold triggers to optimize the asynchronous write operation based on the incoming write request pattern.

As shown in FIG. 7, write controller 320 may determine (at 8) that the first generated asynchronous write request was based on two synchronous write requests that contained 512 KB of coalesced data for the first file and that were received within 2 seconds one another, and that the second generated asynchronous write request was based on three synchronous write requests that contained 512 KB of coalesced data for the second file and that were also received within 2 seconds of one another. Accordingly, write controller 320 may dynamically modify (at 8) the write threshold by decreasing the time trigger for the write threshold from 3 seconds to 2 seconds. Additionally, or alternatively, write controller 320 may dynamically modify (at 8) the write threshold by decreasing the size trigger from 1 MB to 512 KB. By decreasing the time trigger and/or the size trigger, write controller 320 may reduce the delay associated with writing the file data to storage devices 340, thereby increasing performance or throughput of the asynchronous write operation.

Asynchronous storage system 210 may make inverse modifications to the write threshold if the triggers are satisfied too soon. For instance, if the size trigger is set too small such that each individual incoming write request from client devices 110 satisfies the size trigger and causes an asynchronous write request to be issued with only the data from a single synchronous write request, asynchronous storage system 210 may determine the average size of the incoming synchronous write requests, and may increase the size trigger of the write threshold to be equal to the average size of four or more of the incoming synchronous write requests. Asynchronous storage system 210 may also monitor the rate at which incoming synchronous write requests for the same file arrive in order to increase the time trigger of the write threshold so that the time trigger is satisfied at or near the same time as the increased size trigger. As a specific example, if the average size of the incoming synchronous write requests is 256 KB, and the rate at which synchronous write requests for the same file arrive is 1 request per second, then asynchronous storage system 210 may set the size trigger to be 1 MB (e.g., average size for 4 incoming synchronous write requests of the same file), and may set the time trigger to be 4 seconds (e.g., average time to receive 4 incoming asynchronous write requests for the same file).

Asynchronous storage system 210 may configure different write thresholds for different storage devices 340. For instance, a tape backup storage device may have very low write performance relative to a flash memory storage device. To reduce the number of asynchronous write operations that are provided to the tape backup storage device relative to the flash memory storage device, asynchronous storage system 210 may configure a first write threshold with a large first size trigger and a large first time trigger for the tape backup storage device, and may configure a second write threshold with a smaller second size trigger and a smaller second time trigger for the flash memory storage device.

In some embodiments, the upper limit for the size trigger and/or time trigger of a particular write threshold that is configured for a particular storage device may be based on the amount of time or the amount of data that the particular storage device can successfully write to storage in the event of a power failure. For instance, a storage device may have capacitors or backup power reserves that allow the storage device to successfully write up 3 MB of data in the event of a power interruption, and so asynchronous storage system 210 may set the upper limit of the size trigger and the time trigger based on the storage device's ability to write up 3 MB of data in the event of a power interruption.

In some embodiments, asynchronous storage system 210 may support out-of-band messaging with client devices 110 for files and/or data that cannot be successfully written to a target destination because of failures or outages affecting the one or more storage devices for that target destination. The out-of-band messaging may be used in limited situations in which asynchronous storage system 210 provided a client device 110 with one or more confirmation messages in response to receiving one or more synchronous write requests form that client device 110, and asynchronous storage system 210 was unable to successfully write the data from the synchronous write requests to any of the storage devices that are associated with the target destination after multiple retry attempts. In such cases, the out-of-band messaging may notify the client device 110 of the failure, provide an alternate destination where the data is stored, and/or other actions that client device 110 may perform to store the data elsewhere within asynchronous storage system 210.

Figure 8:
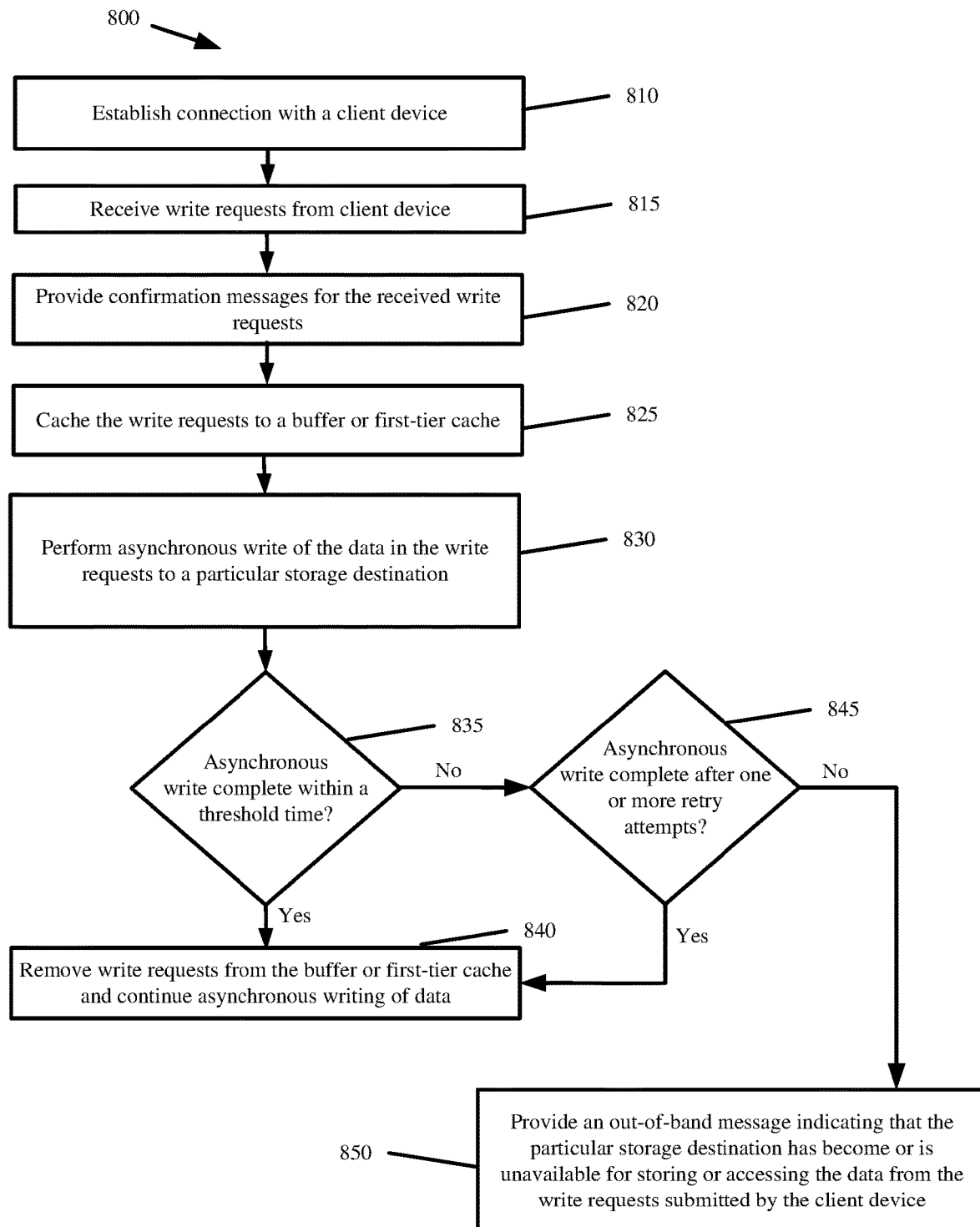
FIG. 8 presents a process for the asynchronous storage of data that is unsuccessfully written to a target destination in accordance with some embodiments presented herein.

FIG. 8 presents a process 800 for the asynchronous storage of data that is unsuccessfully written to a target destination in accordance with some embodiments presented herein. Process 800 may be implemented by asynchronous storage system 210.

Process 800 may include establishing (at 810) a connection between a client device 110 and asynchronous storage system 210. The connection may include a network connection that is established according to a particular network protocol that may be used for network file access or remote file access.

Process 800 may include receiving (at 815) one or more write requests from client device 110. The one or more write requests may contain different data for a common file and/or may be directed to a particular storage destination, wherein the particular storage destination may be specified with a URI, metadata, or other identifiers, and wherein the particular storage destination may correspond to a cluster of storage devices 340. The one or more write requests from client device 110 may be intermixed with write requests that are received from other client devices 110 or other write requests from client device 110 that contain data for different files.

Process 800 may include providing (at 820) confirmation messages to client device 110 as the one or more write requests are received, and caching (at 825) the one or more write requests to a buffer or first-tier cache of asynchronous storage system 210. The confirmation messages may notify client device 110 that the one or more write requests have been successfully stored despite the actual data awaiting writing to the particular storage destination.

Process 800 may include performing (at 830) an asynchronous write of the data in the one or more write requests to the particular storage destination in response to one or more triggers of the write threshold configured for the particular storage destination being satisfied. As noted above, asynchronous storage system 210 may coalesce the data from the one or more write requests into a single asynchronous write request that is issued to one or more storage devices at the particular storage destination.

Process 800 may include determining (at 835) if the asynchronous write operation is completed within a threshold time. The determination (at 835) may be based on the particular storage destination returning a confirmation message for the asynchronous write request that indicates that the data has been successfully stored at the particular storage destination.

In response to determining (at 835—Yes) that the asynchronous write operation is completed within the threshold time, process 800 may include removing (at 840) the one or more write requests from the buffer or the first-tier cache, and continuing to asynchronously process other synchronously received write requests.

In response to determining (at 835—No) that the asynchronous write operation is not completed within the threshold time, process 800 may include retrying (at 845) the particular storage destination one or more times.

In response to determining (at 845—Yes) that the asynchronous write operation is completed with the one or retry attempts, process 800 may include removing (at 840) the one or more write requests from the buffer or the first-tier cache, and continuing to asynchronously process other synchronously received write requests.

In response to determining (at 845—No) that the asynchronous write operation is not completed after the one or retry attempts, process 800 may include providing (at 850) the client device 110 with an out-of-band message indicating that the particular storage destination has become or is unavailable for storing or accessing the data from the one or more write requests submitted by client device 110. In some embodiments, the out-of-band message may include alternative storage destinations where the data may be stored and/or accessed, and client device 110 may respond to the out-of-band message by accepting storage of the data in one of the alternative storage destinations. In some embodiments, asynchronous storage system 210 may automatically select and store the data to an alternative storage device, may notify client device 110 of the alternative location via the out-of-band message, and/or may transition the data from the alternative storage device to the particular storage destination upon the particular storage destination coming back online after some period of time. In some embodiments, the out-of-band message may notify client device 110 to resubmit the data to another storage destination. The out-of-band message may include an HTTP message, an email, a text message, or other form of digital communication with the client device 110. The out-of-band message may be part of manual process in which a user is notified and/or provides a response. The out-of-band message may also be part of a failover process performed by asynchronous storage system 210 and a file system or operating system of client device 110.

Figure 9:
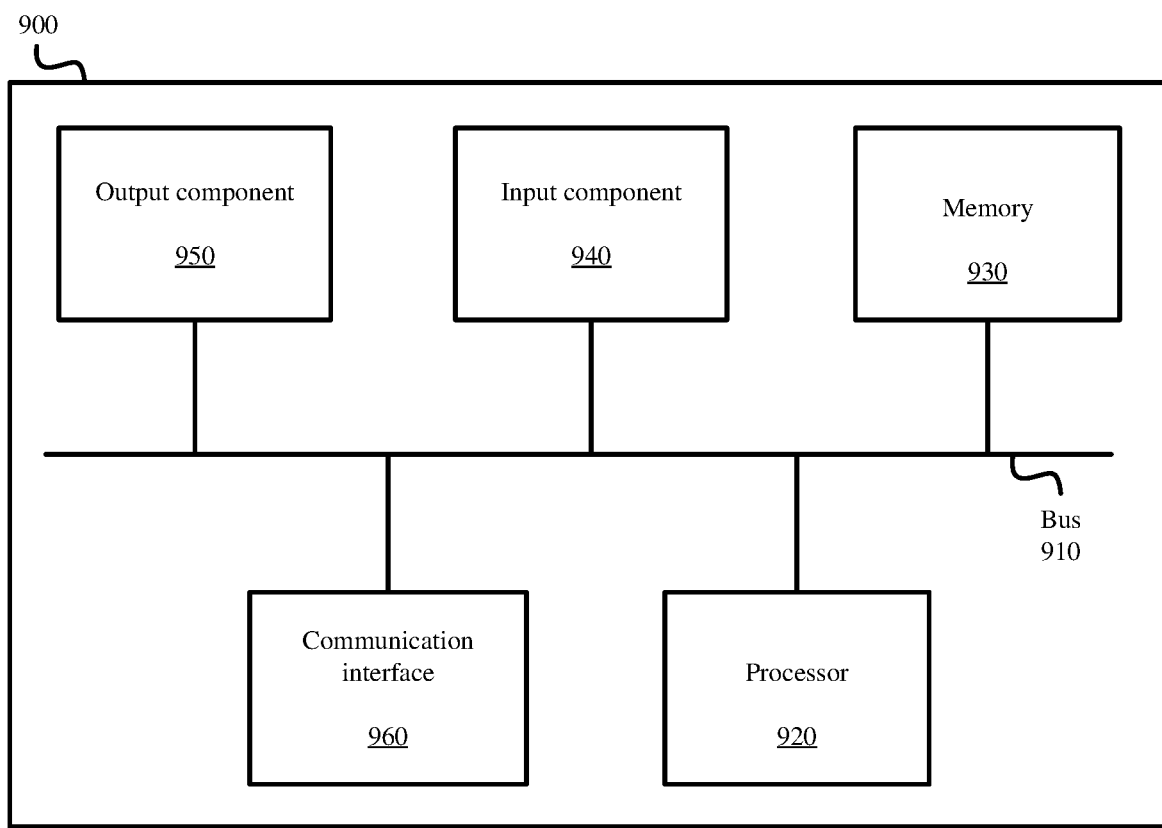
FIG. 9 illustrates example components of one or more devices, according to one or more embodiments described herein.

FIG. 9 is a diagram of example components of device 900. Device 900 may be used to implement one or more of the devices or systems described above (e.g., point cloud comparator 305). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving, from at least one client device at a first time, a first write request to write first data to a storage device;
providing, at the first time, a first confirmation message to the client device prior to writing the first data to the storage device;
determining that the first data is insufficient to satisfy a write threshold for writing the first data to the storage device, wherein the write threshold is satisfied upon receiving a particular amount of coalesced data for a particular file;
cache the first data in a local cache without writing the first data to the storage device in response to determining that the first data is less than the particular amount of coalesced data for satisfying the write threshold;
receiving, from the client device at a second time that is after the first time, a second write request to write second data to the storage device, and a third write request to write third data to the storage device after receiving the first write request;
providing, at the second time, a second confirmation message to the client device in response to the second write request, and a third confirmation message to the client device in response to the third write request and prior to writing the first data or the third data to the storage device;
caching the second data and the third data in the local cache with the first data;
determining that the first data and the second data are sufficient to satisfy the write threshold based on the first data and the second data comprising data for a same file, and total data from the first data and the second data being equal to or greater than the particular amount of coalesced data for the particular file necessary to satisfy the write threshold, wherein the particular amount of coalesced data satisfying the write threshold is less than a size of the local cache, wherein the third data comprises data for a different file than the first data and the second data, and wherein the particular amount of coalesced data is defined independent of the size of the local cache; and
providing, to the storage device or a file system associated with the storage device, a single request with the first data and the second data in response to determining that the first data and the second data are sufficient to satisfy the write threshold, wherein said providing comprises issuing the single request in place of the first write request and the second write request.

2. The method of claim 1 further comprising:
writing the first data and the second data to the storage device with a single write operation that is executed in response to the single request, and wherein the particular amount of coalesced data for satisfying the write threshold corresponds to a total amount of data that the storage device writes with the single write operation.

3. The method of claim 1 further comprising:
coalescing the first data and the second data to the single request based on the first write request and the second write request comprising a first file identifier, that indicates the first data and the second data are part of a common first file, and based on the third write request comprising a different second file identifier, that indicates the third data is part of another second file; and
wherein caching the second data and the third data comprises buffering the third data to the local cache in response to determining that the third data and other received data for the second file are insufficient to satisfy the write threshold.

4. The method of claim 1 further comprising:
receiving a plurality of write requests that contain data for different files at the first time; and
determining that the first data from the first write request is for a first file, and that the data from the plurality of write requests are for files that are different than the first file.

5. The method of claim 4 further comprising:
coalescing data from a set of non-consecutive write requests in the plurality of write requests that contain data for a second file; and
issuing, to the storage device or the file system associated with the storage device, a different single request with the data that is coalesced from each write request of the set of non-consecutive write requests.

6. The method of claim 4 further comprising:
writing the data from the plurality of write requests to the storage device in a first order that is different than a second order at which the plurality of write requests are received, wherein the first order is based on the data from different subsets of the plurality of write requests being sufficient to satisfy the write threshold and being directed to a common file.

7. The method of claim 4 further comprising:
grouping the plurality of write requests into different sets of write requests, wherein each set of write requests comprises write requests that contain data for a different file.

8. The method of claim 7 further comprising:
providing a single request to write collective data from each particular set of write requests with a single write operation in response to the collective data from the particular set of write requests satisfying the write threshold.

9. The method of claim 1 further comprising:
querying parameters of the storage device; and
configuring the write threshold based on the parameters of the storage device.

10. The method of claim 9, wherein configuring the write threshold comprises:
setting the particular amount of coalesced data as a number of bytes of data from a common file at which the write threshold is satisfied.

11. The method of claim 10, wherein configuring the write threshold further comprises:
setting an expiration time at which the write threshold is satisfied after receiving an initial write request containing data for a specific file and prior to receiving the number of bytes of data for the specific file.

12. The method of claim 1 further comprising:
removing the first data from the local cache in response to writing the first data and the second data to the storage device after providing the single request.

13. The method of claim 1,
wherein the single request with the first data and the second data is a first asynchronous write request,
wherein the third data of the third write request comprises data of a first file, and
wherein the first data of the first write request comprises data of a different second file; and
the method further comprising providing, to the storage device or the file system associated with the storage device, a second asynchronous write request with the third data after providing the first asynchronous write request in response to a time trigger, that starts upon receiving the third write request, being satisfied prior to collective data for the first file in at least the second asynchronous write request satisfying the write threshold.

14. The method of claim 1 further comprising:
modifying the write threshold in response to providing the single request with data that is coalesced from less than a specified number of write requests.

15. The method of claim 1 further comprising:
modifying the write threshold in response to providing the single request before a threshold amount of time since an earlier issued single request.

16. The method of claim 1,
wherein the first confirmation message is an indication to the client device that the first data has been stored prior to the first data being written to the storage device; and
wherein the second confirmation message is an indication to the client device that the second data has been stored prior to the second data being written to the storage device.

17. The method of claim 16 further comprising:
receiving a third confirmation message at a third time from the storage device, wherein the third confirmation message is an indication that the first data and the second data have been successfully stored to the storage device.

18. An asynchronous storage system comprising:
a local cache;
at least one storage device; and
one or more processors configured to:
receive, at a first time, a first write request to write first data to a storage device from at least one client device;
provide, at the first time, a first confirmation message to the client device prior to writing the first data to the storage device;
determine that the first data is insufficient to satisfy a write threshold for writing the first data to the storage device, wherein the write threshold is satisfied upon receiving a particular amount of coalesced data for a particular file;
cache the first data in the local cache without writing the first data to the at least one storage device in response to determining that the first data is less than the particular amount of coalesced data for satisfying the write threshold receive, at a second time that is after the first time, a second write request to write second data to the storage device from the client device, and a third write request to write third data to the storage device after receiving the first write request;
provide, at the second time, a second confirmation message to the client device in response to the second write request, and a third confirmation message to the client device in response to the third write request and prior to writing the first data or the third data to the storage device;
cache the second data and the third data in the local cache with the first data;
determine that the first data and the second data are sufficient to satisfy the write threshold based on the first data and the second data comprising data for a same file, and total data from the first data and the second data being equal to or greater than the particular amount of coalesced data for the particular file necessary to satisfy the write threshold, wherein the particular amount of coalesced data satisfying the write threshold is less than a size of the local cache, wherein the third data comprises data for a different file than the first data and the second data, and wherein the particular amount of coalesced data is defined independent of the size of the local cache; and
provide, to the storage device or a file system associated with the storage device, a single request with the first data and the second data in response to determining that the first data and the second data are sufficient to satisfy the write threshold, wherein said providing comprises issuing the single request in place of the first write request and the second write request.

* * * * *